(12) United States Patent
Strand et al.

(10) Patent No.: US 7,235,623 B2
(45) Date of Patent: Jun. 26, 2007

(54) POLYESTER COMPOSITIONS FOR CALENDERING

(75) Inventors: Marc Alan Strand, Kingsport, TN (US); Rodney Layne Piner, Kingsport, TN (US); Eric Jon Moskala, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 24 days.

(21) Appl. No.: 10/722,870

(22) Filed: Nov. 26, 2003

(65) Prior Publication Data

US 2005/0113556 A1    May 26, 2005

(51) Int. Cl.
C08G 63/00    (2006.01)

(52) U.S. Cl. .............. 528/272; 528/298; 528/307; 528/308; 528/308.6

(58) Field of Classification Search ........... 528/272, 528/298, 307, 308, 308.6
See application file for complete search history.

(56) References Cited

U.S. PATENT DOCUMENTS

| | | |
|---|---|---|
| 2,012,267 A | 8/1935 | Carothers |
| 2,044,612 A | 6/1936 | Jaeger |
| 3,186,961 A | 6/1965 | Sears |
| 3,658,978 A | 4/1972 | Ancker |
| 3,873,496 A | 3/1975 | Hills |
| 3,883,478 A | 5/1975 | Gresham |
| 4,045,431 A | 8/1977 | Fagerburg |
| 4,258,153 A | 3/1981 | Yomamoto et al. |
| 4,340,526 A | 7/1982 | Petke et al. |
| 4,391,938 A | 7/1983 | Memon et al. |
| 4,450,250 A | 5/1984 | McConnell et al. |
| 4,506,043 A | 3/1985 | Ogawa et al. |
| 4,814,426 A | 3/1989 | Utsumi et al. |
| 4,837,254 A | 6/1989 | Branscome |
| 4,873,270 A | 10/1989 | Aime et al. |
| 4,963,418 A | 10/1990 | Isaka et al. |
| 4,996,291 A | 2/1991 | Yoshinaka et al. |
| 5,017,680 A | 5/1991 | Sublett |
| 5,256,714 A | 10/1993 | Liu et al. |
| 5,290,631 A | 3/1994 | Fleury et al. |
| 5,399,595 A | 3/1995 | Sublett et al. |
| 5,399,661 A * | 3/1995 | Borman ........... 528/307 |
| 5,484,632 A | 1/1996 | Mercer, Jr. et al. |
| 5,489,470 A | 2/1996 | Noda |
| 5,498,692 A | 3/1996 | Noda |
| 5,502,116 A | 3/1996 | Noda |
| 5,532,049 A | 7/1996 | Masuda et al. |
| 5,534,570 A | 7/1996 | Shih et al. |
| 5,536,564 A | 7/1996 | Noda |
| 5,589,126 A | 12/1996 | Shih et al. |
| 5,602,227 A | 2/1997 | Noda |
| 5,618,855 A | 4/1997 | Noda |
| 5,624,987 A | 4/1997 | Brink et al. |
| 5,654,347 A | 8/1997 | Khemani et al. |
| 5,679,288 A * | 10/1997 | Kim et al. ........... 252/609 |
| 5,696,176 A | 12/1997 | Khemani et al. |
| 5,703,160 A | 12/1997 | Dehennau et al. |
| 5,824,398 A | 10/1998 | Shih |
| 5,859,116 A | 1/1999 | Shih |
| 5,900,322 A | 5/1999 | Buchanan et al. |
| 5,928,788 A | 7/1999 | Riedl |
| 5,958,581 A | 9/1999 | Khanarian et al. |
| 5,965,648 A | 10/1999 | Brink et al. |
| 5,998,005 A | 12/1999 | Kanno |
| RE36,548 E | 2/2000 | Noda |
| 6,025,061 A | 2/2000 | Khanarian et al. |
| 6,054,551 A | 4/2000 | Cornell et al. |
| 6,068,910 A * | 5/2000 | Flynn et al. ........... 428/141 |
| 6,077,931 A | 6/2000 | Noda |
| 6,103,857 A | 8/2000 | Jones et al. |
| 6,114,431 A | 9/2000 | Lee et al. |
| 6,127,512 A | 10/2000 | Asrar et al. |
| 6,160,199 A | 12/2000 | Noda |

(Continued)

FOREIGN PATENT DOCUMENTS

DE    100 40 691 A1    2/2002

(Continued)

OTHER PUBLICATIONS

U.S. Appl. No. 10/086,905, filed Mar. 27, 2003, Moskala et al.

(Continued)

*Primary Examiner*—Terressa Boykin
(74) *Attorney, Agent, or Firm*—Louis N. Moreno; Eric D. Middlemas; Bernard J. Graves, Jr.

(57) ABSTRACT

Polyester compositions that provide a higher throughput in calendering processes may be prepared from a polyester having crystallization half time of at least 5 minutes, an inherent viscosity of about 0.55 to about 0.75 dL/g, a branching monomer, and a release additive. The polyester compositions show a combination of excellent melt strength with good shear response that permits higher calendering line speeds before melt fracture occurs. Also disclosed are processes for film or sheet by calendering the above compositions and the film or sheet produced therefrom. The polyester compositions, film, or sheet also may include plasticizers and/or flame retardants to increase their flexibility and enable their use in commercial applications requiring flame resistance. The film and sheet have excellent appearance and can be used in a wide range of decorative and packaging applications.

33 Claims, No Drawings

U.S. PATENT DOCUMENTS

| | | |
|---|---|---|
| 6,174,990 B1 | 1/2001 | Noda |
| 6,231,970 B1 | 5/2001 | Anderson et al. |
| 6,326,435 B1 | 12/2001 | Takayama et al. |
| 6,350,530 B1 | 2/2002 | Morikawa et al. |
| 6,482,872 B2 | 11/2002 | Downie |
| 6,551,688 B2 | 4/2003 | Moskala et al. |
| 6,551,699 B1 | 4/2003 | Flynn |
| 6,569,990 B1 | 5/2003 | Noda |
| 6,632,390 B1 | 10/2003 | Shelby et al. |
| 2001/0027225 A1 | 10/2001 | Downie |
| 2002/0061944 A1 | 5/2002 | Asrar et al. |
| 2003/0060542 A1 | 3/2003 | Witt et al. |
| 2003/0145518 A1 | 8/2003 | Noda et al. |
| 2003/0171471 A1 | 9/2003 | Pritschins et al. |
| 2003/0187149 A1 | 10/2003 | Schmidt et al. |
| 2003/0212244 A1 | 11/2003 | Hayes et al. |
| 2004/0024101 A1 | 2/2004 | Hayes |
| 2004/0024102 A1 | 2/2004 | Hayes et al. |
| 2004/0039092 A1 | 2/2004 | Asrar et al. |
| 2004/0068059 A1 | 4/2004 | Katayama et al. |
| 2004/0127609 A1* | 7/2004 | Strand et al. ............... 524/115 |
| 2004/0152810 A1 | 8/2004 | Takenaka et al. |

FOREIGN PATENT DOCUMENTS

| | | |
|---|---|---|
| EP | 0 724 947 A1 | 8/1996 |
| EP | 0 744 439 A1 | 11/1996 |
| EP | 0 484 818 | 1/1997 |
| EP | 0 965 615 A1 | 12/1999 |
| EP | 1 054 038 A1 | 11/2000 |
| EP | 1 375 556 A2 | 2/2004 |
| EP | 1 529 808 A2 | 5/2005 |
| EP | 1 529 809 A1 | 5/2005 |
| GB | 805 586 A | 12/1958 |
| GB | 805 587 | 12/1958 |
| GB | 805 588 | 12/1958 |
| GB | 815 991 | 7/1959 |
| GB | 1 323 478 | 9/1973 |
| JP | 1-138260 A | 5/1989 |
| JP | 001138260 * | 5/1989 |
| JP | 1138260 * | 5/1989 |
| JP | 1-49741 B2 | 10/1989 |
| JP | 8-142290 A | 11/1990 |
| JP | 10-291225 A | 11/1990 |
| JP | 4-62144 | 2/1992 |
| JP | 4-117432 | 4/1992 |
| JP | 4-166309 | 6/1992 |
| JP | 5-271397 A | 10/1993 |
| JP | 7-60924 A | 3/1995 |
| JP | 7-278418 A2 | 10/1995 |
| JP | 8-283547 A | 10/1996 |
| JP | 9-40823 A | 2/1997 |
| JP | 9-66590 A2 | 3/1997 |
| JP | 9-217014 | 8/1997 |
| JP | 9-272191 A | 10/1997 |
| JP | 11-158358 A | 6/1999 |
| JP | 2-986197 | 10/1999 |
| JP | 11-343353 A | 12/1999 |
| JP | 2000-136294 A | 5/2000 |
| JP | 2000-302951 A | 10/2000 |
| JP | 2000-327891 | 11/2000 |
| JP | 2000-336256 A | 12/2000 |
| JP | 2001-18344 A | 1/2001 |
| JP | 2001-40197 | 2/2001 |
| JP | 2001-64496 A | 3/2001 |
| JP | 2001-214044 A | 8/2001 |
| JP | 2001-279068 A | 10/2001 |
| JP | 2001-302833 A | 10/2001 |
| JP | 2001-354842 A | 12/2001 |
| JP | 2002-53740 A | 2/2002 |
| JP | 2002-53741 A | 2/2002 |
| JP | 2002-121362 A | 4/2002 |
| JP | 2002-129002 A | 5/2002 |
| JP | 2002-129483 A | 5/2002 |
| JP | 10-363908 A | 7/2002 |
| JP | 2002-275217 A | 9/2002 |
| JP | 2002-294043 A | 10/2002 |
| JP | 2003-20386 A | 1/2003 |
| JP | 2003-128773 A | 5/2003 |
| JP | 2003-128889 A | 5/2003 |
| JP | 2003-128890 A | 5/2003 |
| JP | 2003-128894 A | 5/2003 |
| JP | 2003-154539 A | 5/2003 |
| JP | 2003-155401 A | 5/2003 |
| JP | 2003-155402 A | 5/2003 |
| JP | 2003-171537 A | 6/2003 |
| JP | 2003-191266 A | 7/2003 |
| JP | 2003-201391 A | 7/2003 |
| JP | 2003-277592 A | 10/2003 |
| JP | 2004-143353 A | 5/2004 |
| JP | 2001-200146 A | 7/2004 |
| JP | 2004-182759 A | 7/2004 |
| JP | 2004-238534 A | 8/2004 |
| JP | 2005-8771 A | 1/2005 |
| WO | WO 87/03291 A | 6/1987 |
| WO | WO 94/28061 A | 12/1994 |
| WO | WO 95/14734 | 6/1995 |
| WO | WO 95/20614 A1 | 8/1995 |
| WO | WO 97/10302 | 3/1997 |
| WO | WO 97/42260 | 11/1997 |
| WO | WO 97/49757 A | 12/1997 |
| WO | WO 99/23146 A1 | 5/1999 |
| WO | WO 99/47605 A | 9/1999 |
| WO | WO 00/37544 A1 | 6/2000 |
| WO | WO 01/85451 A1 | 11/2001 |
| WO | WO 02/28967 A1 | 4/2002 |
| WO | WO 2004/029147 A1 | 4/2004 |
| WO | WO 2004/060990 A2 | 7/2004 |

OTHER PUBLICATIONS

U.S. Appl. No. 10/706,669, filed Nov. 12, 2003, Strand.
Database WPI, Section CH, Week 9702, XP-002106151, Derwent Publications, Ltd., Oct. 29, 1996, London, GB.
Jim Butschli, Packaging World, pp. 26-28, Jun. 1997.
W.V. Titow, PVC Technology, 4th Edition, pp. 803-848 (1984), Elsevier Publishing Co.
Material Safety Data Sheet, "EASTAR" PETG Copolyester 6763, Oct. 23, 1997.
Anonymous Research Disclosure 23314, Sep. 1983.
Fox equation, T.G. Fox, Bull. Am. Phys. Soc., 1, 123 (1956).
"The Technology of Plasticizers", by J. Kern Sears and Joseph R. Darby, published by Society of Plastic Engineers/Wiley and sons, New York, 1982, pp. 134-137.
Coleman et al., Polymer 31, (1990), 1187-1203.
Elias, H. *Macromolecules*, Plenum Press: NY, 1977, p. 391.
Office action dated Jun. 22, 2005, for U.S. Appl. No. 10/706,669, filed on Nov. 2, 2003.
International Search Report dated Apr. 27, 2005, for PCT/US2004/041737.
International Search Report dated Apr. 27, 2005, for PCT/US2004/041638.
Office action dated Jun. 1, 2005 for U.S. Appl. No. 10/086,905, filed on Feb. 28, 2002.
Office Action dated Feb. 3, 2005 for U.S. Appl. No. 10/086,905, filed on Feb. 28, 2002.
John Davis; Flame retardants: halogen-free systems (including phophorus additives); Plastics Additives: An A-Z Reference; 1998; pp. 277-286; Chapman & Hall, London.

* cited by examiner

POLYESTER COMPOSITIONS FOR CALENDERING

TECHNICAL FIELD OF THE INVENTION

This invention pertains to polyester compositions for calendering and, more specifically, to polyester compositions which enable higher rates of production in calendering processes. The invention further pertains to calendering processes for these polyester compositions and to polyester film or sheet produced therefrom.

BACKGROUND OF THE INVENTION

Calendering is an economic and highly efficient means to produce film and sheet from plastics such as plasticized and rigid poly(vinyl chloride), abbreviated herein as "PVC", and polypropylene compositions. The film and sheet usually have a thickness ranging from about 2 mils (0.05 mm) to about 80 mils (2.0 mm). Calendered PVC film or sheet are readily thermoformed into various shapes that can be used in a wide range of applications including packaging, pool liners, graphic arts, transaction cards, security cards, veneers, wall coverings, book bindings, folders, floor tiles, and products which are printed, decorated, or laminated in a secondary operation. Additional discussion on polypropylene resin compositions used in calendering processes may be found in Japan Application No. Hei 7-197213 and European Patent Application No. 0 744 439 A1.

By contrast, conventional processing of polyesters into film or sheet involves extruding a polyester melt through a manifold of a flat die. Manual or automatic die lip adjustment is used to control thickness across a web of material. Water-cooled chill rolls are used to quench the molten web and impart a smooth surface finish. Although extrusion processes produce film and sheet of excellent quality, extrusion methods do not have the throughput and economic advantages of calendering processes.

PVC compositions are, by far, the largest segment of the calendered film and sheet business. Small amounts of other thermoplastic polymers such as, for example, thermoplastic rubbers, certain polyurethanes, talc-filled polypropylene, acrylonitrile/buta-diene/styrene terpolymers (ABS resins), and chlorinated polyethylene, are sometimes processed by calendering methods. By contrast, polyester polymers such as, for example, poly(ethylene terephthalate), abbreviated herein as "PET", or poly(1,4-butylene terephthalate), abbreviated herein as "PBT", are difficult to calender successfully. For example, PET polymers with inherent viscosity values of about 0.6 deciliters/gram (abbreviated herein as "dL/g"), typically have insufficient melt strength to perform properly on the calendering rolls. Melt strength is defined as the ability of a polymer to support its weight in the molten state. In calendering, melt strength is related to the ability to remove the film from the roll process without deformation. For example, when calendered, a polymer with low melt strength will quickly sag and hit the floor; whereas, a polymer with high melt strength will maintain its shape for a much longer amount of time and can be further processed. Melt strength is thus important to minimize the amount of "drawdown" and gravity-induced sagging the polymer experiences during the calendering process. Drawdown is defined in calendering as the amount of thickness reduction between the calendering rolls and the take-up system and is expressed as the ratio of the nominal thickness or width dimension as the film exits the calendering rolls with the same dimension at the take up roles. Also, PET and other polyester polymers are prone to crystallize at typical processing temperatures of 160° C. to 180° C., resulting a non-homogeneous mass which also causes high forces on the calender bearings. Increasing processing temperatures will reduce melt viscosity and improve processability. Higher temperatures, however, can cause degradation of the polyester such as, for example, by thermal degradation, hydrolysis of polymer by exposure to atmospheric moisture, and the formation of color bodies. Typical PET polymers also have a tendency to stick to the calendering rolls at higher processing temperatures. The calendering of various polyester compositions and several approaches to these problems has been described, for example, in U.S. Pat. Nos. 5,998,005; 6,068,910; 6,551,688; U.S. patent application Ser. No. 10/086,905; Japan Patent Application Nos. 8-283547; 7-278418; 2000-243055; 10-363-908; 2000-310710; 2001-331315; 11-158358; and World Patent Application No. 02/28967. Although some these difficulties can be avoided by the careful selection of polymer properties, additives, and processing conditions, calendering of polyesters at high rates of production is difficult.

The rate of production in a calendering process, usually referred to as line speed, is determined by several factors. Equipment design and capability, for example, will have a large influence on how fast and efficient a calendering process will run. Absent any equipment limitations, however, the line speed and efficiency of a calendering process is highly dependent on the material being run.

The higher the line speed, the greater the chances that melt fracture will result. Melt fracture gives a rough, frosty or hazy appearance to the material and is the result of the material not being able to respond to the shear applied during the process. Melt fracture occurs whenever the wall shear stress on the calendering roll exceeds a certain value (typically 0.1 to 0.2 MPa) and the onset of melt fracture is often the rate determining step in a calendering process. Shear stress is controlled by the volume throughput or line speed (which dictates the shear rate) and the viscosity of the polymer melt. By reducing either the line speed or the viscosity at high shear rates, the wall shear stress is reduced and the chance for melt fracture is lowered. Reducing shear stress, therefore, will reduce the chances of melt fracture as the line speed of a calendering process is increased. Reducing shear stress and melt fracture in polyesters has been addressed in extrusion processes. For example, U.S. Pat. No. 6,632,390 describes a process for producing a profile extrusion in which the processability of the polyester composition is improved by the addition of a branching agent, which provides increased melt strength and increased high shear thinning. The polyester composition has an inherent viscosity of at least 0.65 dL/g. Polyester polymers, however, often show a relatively flat shear-thinning response (i.e., there is little change in the melt viscosity of the polymer between low and high shear rates) in calendering processes in comparison to polymers typically processed by calendering such as, for example, PVC or polypropylene. Thus, if a polyester with a higher melt viscosity is used to obtain sufficient melt strength, insufficient shear thinning often causes unacceptably high forces on the calender bearings. Increasing the processing temperature can reduce the occurrence of melt fracture in calendering but, as noted above, also can result in polymer degradation and an unsatisfactory polymer melt strength. Thus, the difficulties presented by shear response and melt-strength frequently prevent polyester polymers from being calendered at high line speeds and/or lower processing temperatures where the highest product quality and lowest production cost may be obtained. To address these problems, a polyester that is capable of being calendered at high line speeds and/or at lower processing temperatures is needed.

SUMMARY OF THE INVENTION

We have determined that polyesters with a proper balance of inherent viscosity and branching provide superior processing characteristics during calendering. We have unexpectedly discovered that polyester compositions that provide a higher throughput in calendering processes may be prepared from polyesters having a crystallization half time of at least 5 minutes, an inherent viscosity of about 0.55 to about 0.75 deciliters/gram (dL/g), a branching monomer, and a release additive. Our invention thus provides a polyester composition for calendering, comprising: (a) a polyester comprising diacid residues, diol residues, and branching monomer residues in which the polyester is a random copolymer having a crystallization half time from a molten state of at least 5 minutes and an inherent viscosity of about 0.55 to about 0.75 dL/g; and (b) an additive effective to prevent sticking of the polyester to calendering rolls. Our novel polyester composition shows an unexpected combination of excellent melt strength with a good shear response that allows higher calendering line speeds before melt fracture occurs. Higher calendering line speeds, in turn, provides for more economical production of polyester sheet or film in commercial applications.

Our invention also provides a process for film or sheet, comprising calendering a polyester composition comprising:
(a) a polyester having a crystallization half time from a molten state of at least 30 minutes and an inherent viscosity of about 0.55 to about 0.75 dL/g, in which the polyester is a random copolymer comprising
  (i) diacid residues comprising at least 80 mole percent, based on the total moles of diacid residues, of one or more residues of: terephthalic acid, naphthalenedicarboxylic acid, 1,4-cyclohexanedicarboxylic acid, or isophthalic acid;
  (ii) diol residues comprising about 10 to about 100 mole percent, based on the total moles of diol residues, of the residues of 1,4-cyclohexanedimethanol and 0 to about 90 mole percent of the residues of one or more diols selected from ethylene glycol, 1,2-propanediol, 1,3-propanediol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol; and
  (iii) branching monomer residues comprising about 0.05 to about 1 weight percent (wt %), based on the total weight of the polyester, of the residues one or more of monomers having 3 or more carboxyl substituents, hydroxyl substituents, or a combination thereof; and
(b) an additive effective to prevent sticking of the polyester to calendering rolls. In addition, the present invention provides a polyester film or sheet produced by the calendering processes described herein. Our polyester composition, film, or sheet may also include plasticizers and/or flame retardants to increase their flexibility and enable their use in commercial applications requiring flame resistance. The film or sheet have an excellent appearance, flexibility, and flame retardancy and can be used in a great variety of decorative and packaging applications. The film or sheet are readily thermoformed into various shapes for specific packaging applications for both food and non-food products. They may be printed with a wide variety of inks and may be laminated either in-line or off-line with fabrics or other plastic film or sheet. Some specific end uses include graphic arts, transaction cards, security cards, veneers, wall coverings, book bindings, folders and the like.

DETAILED DESCRIPTION

Polyester compositions typically have been difficult to incorporate into calendering processes for the production of film or sheet. As discussed above, polyesters heretofore have not had the proper combination of melt strength and shear thinning to permit calendering at high line speeds and at lower temperatures. The ideal polyester would thus have a high melt strength and a high degree of shear thinning so that the polyester could be run at the high speeds associated with efficient commercial calendering process without sagging and melt fracture.

The present invention provides a polyester composition with high melt strength and a high degree of shear thinning making it suitable for use in high speed calendering processes. Thus, in a general embodiment, the invention provides a polyester composition for calendering, comprising: (a) a polyester comprising diacid residues, diol residues, and branching monomer residues in which the polyester is a random copolymer having a crystallization half time from a molten state of at least 5 minutes and an inherent viscosity of about 0.55 to about 0.75 dL/g; and (b) an additive effective to prevent sticking of the polyester to calendering rolls. The inherent viscosity (abbreviated hereinafter as "I.V.") in combination with branching agent imparts higher melt strength and a higher degree of shear thinning which allows our novel polyester composition to be calendered at lower temperatures, at high line speeds, and without excessive drawdown of the resulting film or sheet. The polyester composition may also comprise one or more plasticizers to increase the flexibility and softness of calendared polyester film, improve the processing of the polyester, and help to prevent sticking of the polyester to the calender rolls. The invention also provides a process for film or sheet by calendering the novel polyester compositions and for the film or sheet produced from such calendering processes. The calendered film or sheet typically have a thickness in the range of about 2 mils (0.05 mm) to about 80 mils (2 mm).

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The term "polyester", as used herein, is intended to include "copolyesters" and is understood to mean a synthetic polymer prepared by the polycondensation of one or more difunctional carboxylic acids with one or more difunctional hydroxyl compounds. Typically the difunctional carboxylic acid is a dicarboxylic acid and the difunctional hydroxyl compound is a dihydric alcohol such as, for example, glycols and diols. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer or plasticizer through a polycondensation reaction involving the corresponding monomer. The term "repeating unit", as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The polyester compositions of present invention are prepared from polyesters comprising dicarboxylic acid residues, diol residues, and branching monomer residues. The polyesters of the present invention contain substantially equal molar proportions of acid residues (100 mole %) and diol residues (100 mole %) which react in substantially equal proportions such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % isophthalic acid, based on the total acid residues, means the polyester contains 30 mole % isophthalic acid residues out of a total of 100 mole % acid residues. Thus, there are 30 moles of isophthalic acid residues among every 100 moles of acid residues. In another example, a polyester containing 30 mole % ethylene glycol, based on the total diol residues, means the polyester contains 30 mole % ethylene glycol residues out of a total of 100 mole % diol residues. Thus, there are 30 moles of ethylene glycol residues among every 100 moles of diol residues.

The polyesters of this invention have a crystallization half time from a molten state of at least 5 minutes. The crystallization half time may be, for example, at least 7 minutes, at least 10 minutes, at least 12 minutes, at least 20 minutes, and at least 30 minutes. Typically, polyesters exhibiting a crystallization half time of at least 5 minutes are copolyesters or random copolymers. The term "random copolymer", as used herein, means that the polyester comprises more than one diol and/or diacid residues in which the different diol or diacid residues are randomly distributed along the polymer chain. Thus, the polyesters of the instant invention are not "homopolymers" or "block copolymers" as would be understood by persons of skill in the art. Preferably, the polyesters have a substantially amorphous morphology, meaning that the polyesters comprise substantially unordered regions of polymer. Amorphous or semicrystalline polymers typically exhibit either only a glass transition temperature (abbreviated herein as "Tg") alone or a glass transition temperature in addition to a melting point (abbreviated herein as "Tm"), as measured by well-known techniques such as, for example, differential scanning calorimetry ("DSC"). The desired crystallization kinetics from the melt also may be achieved by the addition of polymeric additives such as, for example, plasticizers, or by altering the molecular weight characteristics of the polymer. The polyesters of the invention also may be a miscible blend of a substantially amorphous polyester with a more crystalline polyester, combined in the proportions necessary to achieve a crystallization half time of at least 5 minutes. In a preferred embodiment, however, the polyesters of our invention are not blends.

The crystallization half time of the polyester, as used herein, may be measured using methods well-known to persons of skill in the art. For example, the crystallization half time may be measured using a Perkin-Elmer Model DSC-2 differential scanning calorimeter. The crystallization half time is measured from the molten state using the following procedure: a 15.0 mg sample of the polyester is sealed in an aluminum pan and heated to 290° C. at a rate of about 320° C./min for 2 minutes. The sample is then cooled immediately to the predetermined isothermal crystallization temperature at a rate of about 320° C./minute in the presence of helium. The isothermal crystallization temperature is the temperature between the glass transition temperature and the melting temperature that gives the highest rate of crystallization. The isothermal crystallization temperature is described, for example, in Elias, H. *Macromolecules*, Plenum Press: NY, 1977, p 391. The crystallization half time is determined as the time span from reaching the isothermal crystallization temperature to the point of a crystallization peak on the DSC curve.

The diacid residues of the polyester comprise at least 80 mole percent (mole %), based on the total moles of diacid residues, of one or more residues of terephthalic acid, naphthalenedicarboxylic acid, 1,4-cyclohexanedicarboxylic acid, or isophthalic acid. Any of the various isomers of naphthalenedicarboxylic acid or mixtures of isomers may be used, but the 1,4-, 1,5-, 2,6-, and 2,7-isomers are preferred. Cyclo-aliphatic dicarboxylic acids such as, for example, 1,4-cyclohexanedicarboxylic acid may be present at the pure cis or trans isomer or as a mixture of cis and trans isomers. For example, the polyester may comprise about 80 to about 100 mole % of diacid residues from terephthalic acid and 0 to about 20 mole % diacid residues from isophthalic acid.

The polyester also contains diol residues that may comprise about 10 to about 100 mole % of the residues of 1,4-cyclohexanedimethanol and 0 to about 90 mole % of the residues of one or more diols containing 2 to about 20 carbon atoms. As used herein, the term "diol" is synonymous with the term "glycol" and means any dihydric alcohol. For example, the diol residues also may comprise about 10 to about 100 mole percent, based on the total moles of diol residues, of the residues of 1,4-cyclohexanedimethanol and 0 to about 90 mole percent of the residues of one or more diols selected from ethylene glycol, 1,2-propanediol, 1,3-propanediol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol. Further examples of diols that may be used in the polyesters of our invention are triethylene glycol; polyethylene glycols; 2,4-dimethyl-2-ethylhexane-1, 3-diol; 2,2-dimethyl-1,3-propanediol; 2-ethyl-2-butyl-1,3-propanediol; 2-ethyl-2-isobutyl-1,3-propanediol; 1,3-butanediol; 1,5-pentanediol; thiodiethanol; 1,2-cyclohexanedimethanol; 1,3-cyclohexanedimethanol; p-xylylenediol; bisphenol S; or combinations of one or more of these glycols. The cycloaliphatic diols, for example, 1,3- and 1,4-cyclohexanedimethanol, may be present as their pure cis or trans isomers or as a mixture of cis and trans isomers. In another example, the diol residues may comprise about 10 to about 100 mole percent of the residues of 1,4-cyclohexanedimethanol and 0 to about 90 mole % of the residues of ethylene glycol. In a further example, the diol residues may comprise about 20 to about 80 mole percent of the residues of 1,4-cyclohexanedimethanol and about 20 to about 80 mole percent of the residues of ethylene glycol. In another example, the diol residues may comprise about 20 to about 70 mole percent of the residues of 1,4-cyclohexanedimethanol and about 80 to about 30 mole percent of the residues of ethylene glycol. In yet another example, the diol residues may comprise about 20 to about 65 mole percent of the residues of 1,4-cyclohexanedimethanol and the diacid residues about 95 to about 100 mole percent of the residues of terephthalic acid.

The polyester also may further comprise from 0 to about 20 mole percent of the residues of one or more modifying diacids containing about 4 to about 40 carbon atoms. Examples of modifying dicarboxylic acids that may be used include aliphatic dicarboxylic acids, alicyclic dicarboxylic acids, aromatic dicarboxylic acids, or mixtures of two or more of these acids. Specific examples of modifying dicarboxylic acids include, but are not limited to, one or more of succinic acid, glutaric acid, adipic acid, suberic acid, sebacic acid, azelaic acid, dimer acid, or sulfoisophthalic acid. Additional examples of modifying diacarboxylic acids are fumaric; maleic; itaconic; 1,3-cyclohexanedicarboxylic; diglycolic; 2,5-norbornanedicarboxylic; phthalic; diphenic; 4,4'-oxydibenzoic; and 4,4'-sulfonyldibenzoic.

The polyester comprises about 0.05 to about 1 weight percent (wt %), based on the total weight of the polyester, of one or more residues of a branching monomer having 3 or more carboxyl substituents, hydroxyl substituents, or a combination thereof. Examples of branching monomers include, but are not limited to, multifunctional acids or glycols such as trimellitic acid, trimellitic anhydride, pyromellitic dianhydride, trimethylolpropane, glycerol, pentaerythritol, citric acid, tartaric acid, 3-hydroxyglutaric acid and the like. Preferably, the branching monomer residues comprise about 0.1 to about 0.7 weight percent of one or more residues of: trimellitic anhydride, pyromellitic dianhydride, glycerol, sorbitol, 1,2,6-hexanetriol, pentaerythritol, trimethylolethane, or trimesic acid. The branching monomer may be added to the polyester reaction mixture or blended with the polyester in the form of a concentrate as described, for example, in U.S. Pat. Nos. 5,654,347 and 5,696,176.

To obtain superior calendering line speeds, the polyesters of the present invention preferably have an inherent viscosity of about 0.55 to about 0.75 dL/g. The inherent viscosity, abbreviated herein as "I.V.", refers to inherent viscosity determinations made at 25° C. using 0.25 gram of polymer per 50 mL of a solvent composed of 60 weight percent phenol and 40 weight percent tetrachloroethane. Other examples of I.V. values which may be exhibited by the polyester compositions are about 0.55 to about 0.70 dL/g, about 0.55 to about 0.65 dL/g, and about 0.60 to about 0.65 dL/g.

In addition to the polyester, the polyester compositions described above comprise an additive that is effective to prevent sticking of the polyester to the calendering rolls. As used herein, the term "effective" means that the polyester passes freely between the calendering rolls without wrapping itself around the rolls or producing an excessive layer of polyester on the surface of the rolls. The amount of additive used in the polyester resin composition is typically about 0.1 to about 10 wt %, based on the total weight percent of the polyester composition. The optimum amount of additive used is determined by factors well known in the art and is dependent upon variations in equipment, material, process conditions, and film thickness. Additional examples of additive levels are about 0.1 to about 5 wt % and about 0.1 to about 2 wt %. Examples of additives of the present invention include fatty acid amides such as erucylamide and stearamide; metal salts of organic acids such as calcium stearate and zinc stearate; fatty acids such as stearic acid, oleic acid, and palmitic acid; fatty acid salts; fatty acid esters; hydrocarbon waxes such as paraffin wax, phosphoric acid esters, polyethylene waxes, and polypropylene waxes; chemically modified polyolefin waxes; ester waxes such as carnauba wax; glycerin esters such as glycerol mono- and di-stearates; talc; microcrystalline silica; and acrylic copolymers (for example, PARALOID® K175 available from Rohm & Haas). Typically, the additive comprises one or more of: erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, or glycerol distearate.

Another additive which may be used comprises a fatty acid or a salt of a fatty acid containing more than 18 carbon atoms and (ii) an ester wax comprising a fatty acid residue containing more than 18 carbon atoms and an alcohol residue containing from 2 to about 28 carbon atoms. The ratio of the fatty acid or salt of a fatty acid to the ester wax may be 1:1 or greater. In this embodiment, the combination of the fatty acid or fatty acid salt and an ester wax at the above ratio gives the additional benefit of providing a film or sheet with a haze value of less than 5%. The additives with fatty acid components containing 18 or less carbon atoms have a lower molecular weight and, thus, become miscible with the polyester. Such miscible additives have less interfacial migration surface qualities resulting in poor release or an increase in haze. In another example, the ratio of the fatty acid or salt of the fatty acid to the ester wax is 2:1 or greater.

The fatty acid may comprise montanic acid in which the salt of the fatty acid may comprise one or more of: the sodium salt of montanic acid, the calcium salt of montanic acid, or the lithium salt of montanic acid. The fatty acid residue of the ester wax may comprise montanic acid. The alcohol residue of the ester wax preferably contains 2 to 28 carbon atoms. Examples of alcohols include montanyl alcohol, ethylene glycol, butylene glycol, glycerol, and pentaerythritol. The additive may also comprise an ester wax which has been partially saponified with a base such as, for example, calcium hydroxide.

The polyesters of the instant invention are readily prepared from the appropriate dicarboxylic acids, esters, anhydrides, or salts, the appropriate diol or diol mixtures, and branching monomers using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation in contrast to a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the polyester may deteriorate in appearance if allowed to reside in a reactor at an elevated temperature for too long a duration.

The polyesters of the present invention are prepared by procedures known to persons skilled in the art. The reaction of the diol, dicarboxylic acid, and branching monomer components may be carried out using conventional polyester polymerization conditions. For example, when preparing the polyester by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or poly-condensation step, is continued under higher vacuum and a temperature which generally ranges from about 230° C. to about 350° C., preferably about 250° C. to about 310° C. and, most preferably, about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, polyesters are produced by reacting the dicarboxylic acid or a mixture of dicarboxylic acids with the diol component or a mixture of diol components and the branching monomer component. The reaction is conducted at a pressure of from about 7 kPa gauge (1 psig) to about 1379 kPa gauge (200 psig), preferably less than 689 kPa (100 psig) to produce a low molecular weight polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

In another embodiment, our invention provides a polyester composition for calendering, comprising:
(a) a polyester having a crystallization half time from a molten state of at least 30 minutes and an inherent viscosity of about 0.55 to about 0.70 dL/g, wherein the polyester is a random copolymer comprising
  (i) diacid residues comprising at least 90 mole percent, based on the total moles of diacid residues, of one or more residues of: terephthalic acid, naphthalenedicarboxylic acid, 1,4-cyclohexanedicarboxylic acid, or isophthalic acid;
  (ii) diol residues comprising about 20 to about 70 mole percent, based on the total moles of diol residues, of one or more residues of: 1,4-cyclohexanedimethanol, neopentyl glycol, or diethylene glycol, and about 30 to about 80 mole percent of the residues of one or more diols selected from ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol; and
  (iii) branching monomer residues comprising about 0.05 to about 0.7 wt %, based on the total weight of the polyester, of the residues of one or more of: trimellitic anhydride, pyromellitic dianhydride, glycerol, sorbitol, 1,2,6-hexanetriol, pentaerythritol, trimethylolethane, or trimesic acid; and
(b) about 0.1 wt % to about 10 wt %, based on the total weight of the polyester composition, of an additive effective to prevent sticking of the polyester to calendering rolls, in which the additive comprises one or more fatty acid amides, metal salts of organic acids, fatty acids, fatty acid salts, fatty acid esters, hydrocarbon waxes, ester waxes, phosphoric acid esters, chemically modified polyolefin waxes; glycerin esters, talc, or acrylic copolymers.

Other examples of I.V. values which may be exhibit by the polyester compositions are about about 0.55 to about 0.65 dL/g and about 0.60 to about 0.65 dL/g. Any of the various isomers of naphthalenedicarboxylic acid or mixtures of isomers may be used, but the 1,4-, 1,5-, 2,6-, and 2,7-isomers are preferred. Also, 1,4-cyclohexanedicarboxylic acid may be present at the pure cis or trans isomer or as a mixture of cis and trans isomers. The polyester, which is a random copolymer, has a crystallization half time of at least 30 minutes.

A preferred additive comprises a fatty acid or a salt of a fatty acid containing more than 18 carbon atoms and (ii) an ester wax comprising a fatty acid residue containing more than 18 carbon atoms and an alcohol residue containing from 2 to about 28 carbon atoms. The ratio of the fatty acid or salt of a fatty acid to the ester wax may be 1:1 or greater. In this embodiment, the combination of the fatty acid or fatty acid salt and an ester wax at the above ratio gives the additional benefit of providing a film or sheet with a haze value of less than 5%. In another example, the ratio of the fatty acid or salt of the fatty acid to the ester wax is 2:1 or greater. The fatty acid may comprise montanic acid and the salt of the fatty acid may comprise one or more of: the sodium salt of montanic acid, the calcium salt of montanic acid, or the lithium salt of montanic acid. The fatty acid residue of the ester wax may comprise montanic acid. Examples of alcohol residues of the ester wax include the residue of montanyl alcohol, ethylene glycol, butylene glycol, glycerol, and pentaerythritol. The additive may also comprise an ester wax which has been partially saponified with a base such as, for example, calcium hydroxide.

Although not essential, the polyester composition of the invention may also comprise a plasticizer. The presence of the plasticizer is useful to enhance flexibility and the good mechanical properties of the calendered film or sheet. The plasticizer also helps to lower the processing temperature of the polyester and may help to prevent sticking of the polyester composition to the calender rolls. The plasticizers typically comprise one or more aromatic rings. The preferred plasticizers are soluble in the polyester as indicated by dissolving a 5-mil (0.127 mm) thick film of the polyester to produce a clear solution at a temperature of 160° C. or less. More preferably, the plasticizers are soluble in the polyester as indicated by dissolving a 5-mil (0.127 mm) thick film of the polyester to produce a clear solution at a temperature of 150° C. or less. The solubility of the plasticizer in the polyester may be determined as follows:

1. Placing into a small vial a ½ inch section of a standard reference film, 5 mils (0.127 mm) in thickness and about equal to the width of the vial.
2. Adding the plasticizer to the vial until the film is covered completely.
3. Placing the vial with the film and plasticizer on a shelf to observe after one hour and again at 4 hours. Note the appearance of the film and liquid.
4. After the ambient observation, placing the vial in a heating block and allow the temperature to remain constant at 75° C. for one hour and observe the appearance of the film and liquid.
5. Repeating step 4 for each of the following temperatures (° C.): 100, 140, 150, and 160.

Examples of plasticizers and their solubilities as determined by the above test are set forth in Table 1. A value of 4 or greater over the temperature indicates that this plasticizer is a candidate for use in the present invention.

TABLE 1

Solubilities of Plasticizers

| | TEMPERATURE (° C.) | | | | | |
|---|---|---|---|---|---|---|
| | 23 | 75 | 100 | 140 | 150 | 160 |
| Adipic Acid Derivatives | | | | | | |
| Dicapryl adipate | 1 | 1 | 1 | 1 | 2 | 2 |
| Di-(2-ethylhexyl adipate) | 1 | 1 | 1 | 1 | 2 | 2 |
| Di(n-heptyl, n-nonyl) adipate | 1 | 1 | 1 | 1 | 2 | 2 |
| Diisobutyl adipate | 1 | 3 | 3 | 3 | 3 | 4 |
| Diisodecyl adipate | 1 | 1 | 1 | 1 | 1 | 1 |
| Dinonyl adipate | 1 | 1 | 1 | 1 | 1 | 2 |
| Di-(tridecyl) adipate | 1 | 1 | 1 | 1 | 1 | 1 |
| Azelaic Acid Derivatives | | | | | | |
| Di-(2-ethylhexyl azelate) | 1 | 1 | 1 | 1 | 2 | 2 |
| Diisodecyl azelate | 1 | 1 | 1 | 1 | 1 | 1 |
| Diisoctyl azealate | 1 | 1 | 1 | 1 | 2 | 2 |
| Dimethyl azelate | 3 | 4 | 4 | 4 | 4 | 6 |
| Di-n-hexyl azelate | 1 | 1 | 2 | 2 | 3 | 3 |
| Benzoic Acid Derivatives | | | | | | |
| Diethylene glycol dibenzoate (DEGDB) | 4 | 4 | 4 | 6 | 6 | 6 |
| Dipropylene glycol dibenzoate | 3 | 3 | 4 | 4 | 4 | 6 |
| Propylene glycol dibenzoate | 1 | 3 | 4 | 6 | 6 | 6 |
| Polyethylene glycol 200 dibenzoate | 4 | 4 | 4 | 4 | 6 | 6 |
| Neopentyl glycol dibenzoate | 0 | 3 | 3 | 3 | 4 | 6 |
| Citric Acid Derivatives | | | | | | |
| Acetyl tri-n-butyl citrate | 1 | 1 | 1 | 2 | 3 | 3 |
| Acetyl triethyl citrate | 1 | 2 | 2 | 2 | 3 | 3 |
| Tri-n-Butyl citrate | 1 | 2 | 3 | 3 | 3 | 3 |
| Triethyl citrate | 3 | 3 | 3 | 3 | 3 | 3 |
| Dimer Acid Derivatives | | | | | | |
| Bis-(2-hydroxyethyl dimerate) | 1 | 1 | 1 | 1 | 2 | 3 |

TABLE 1-continued

Solubilities of Plasticizers

| | TEMPERATURE (° C.) | | | | | |
|---|---|---|---|---|---|---|
| | 23 | 75 | 100 | 140 | 150 | 160 |
| Epoxy Derivatives | | | | | | |
| Epoxidized linseed oil | 1 | 2 | 2 | 2 | 3 | 3 |
| Epoxidized soy bean oil | 1 | 1 | 1 | 1 | 1 | 2 |
| 2-Ethylhexyl epoxytallate | 1 | 1 | 1 | 1 | 3 | 3 |
| Fumaric Acid Derivatives | | | | | | |
| Dibutyl fumarate | 2 | 2 | 3 | 3 | 3 | 3 |
| Glycerol Derivatives | | | | | | |
| Glycerol Tribenzoate | 0 | 0 | 6 | 6 | 6 | 6 |
| Glycerol triacetate | 2 | 3 | 3 | 3 | 3 | 4 |
| Glycerol diacetate monolaurate | 1 | 2 | 2 | 2 | 2 | 4 |
| Isobutyrate Derivative | | | | | | |
| 2,2,4-Trimethyl-1,3-pentanediol, Diisobutyrate | 1 | 1 | 1 | 1 | 3 | 3 |
| Texanol diisobutyrate | 1 | 2 | 2 | 2 | 2 | 4 |
| Isophthalic Acid Derivatives | | | | | | |
| Dimethyl isophthalate | 0 | 5 | 5 | 6 | 6 | 6 |
| Diphenyl isophthalate | 0 | 0 | 0 | 0 | 0 | 0 |
| Di-n-butylphthalate | 2 | 3 | 3 | 3 | 3 | 3 |
| Lauric Acid Derivatives | | | | | | |
| Methyl laurate | 1 | 2 | 3 | 3 | 3 | 3 |
| Linoleic Acid Derivative | | | | | | |
| Methyl linoleate, 75% | 1 | 1 | 2 | 3 | 3 | 3 |
| Maleic Acid Derivatives | | | | | | |
| Di-(2-ethylhexyl) maleate | 1 | 1 | 2 | 3 | 3 | 3 |
| Di-n-butyl maleate | 2 | 3 | 3 | 3 | 3 | 3 |
| Mellitates | | | | | | |
| Tricapryl trimellitate | 1 | 1 | 1 | 1 | 1 | 1 |
| Triisodecyl trimellitate | 1 | 1 | 1 | 1 | 1 | 1 |
| Tri-(n-octyl,n-decyl) trimellitate | 1 | 1 | 1 | 1 | 1 | 1 |
| Triisonyl trimellitate | 1 | 1 | 1 | 1 | 1 | 1 |
| Myristic Acid Derivatives | | | | | | |
| Isopropyl myristate | 1 | 1 | 1 | 2 | 3 | 3 |
| Oleic Acid Derivatives | | | | | | |
| Butyl oleate | 1 | 1 | 1 | 2 | 3 | 3 |
| Glycerol monooleate | 0 | 1 | 1 | 1 | 3 | 3 |
| Glycerol trioleate | 1 | 1 | 1 | 1 | 2 | 2 |
| Methyl oleate | 1 | 1 | 2 | 2 | 3 | 3 |
| n-Propyl oleate | 1 | 1 | 1 | 2 | 3 | 3 |
| Tetrahydrofurfuryl oleate | 1 | 1 | 1 | 2 | 3 | 3 |
| Palmitic Acid Derivatives | | | | | | |
| Isopropyl palmitate | 1 | 1 | 1 | 1 | 2 | 3 |
| Methyl palmitate | 0 | 1 | 1 | 2 | 3 | 3 |
| Paraffin Derivatives | | | | | | |
| Chloroparaffin, 41% Cl | 1 | 1 | 2 | 2 | 2 | 3 |
| Chloroparaffin, 50% Cl | 1 | 2 | 3 | 3 | 3 | 3 |
| Chloroparaffin, 60% Cl | 1 | 5 | 6 | 6 | 6 | 6 |
| Chloroparaffin, 70% Cl | 0 | 0 | 0 | 0 | 0 | 0 |
| Phosphoric Acid Derivatives | | | | | | |
| 2-Ethylhexyl diphenyl phosphate | 2 | 3 | 3 | 3 | 4 | 4 |
| Isodecyl diphenyl phosphate | 1 | 2 | 3 | 3 | 3 | 3 |
| t-Butylphenyl diphenyl phosphate | 1 | 3 | 3 | 4 | 6 | 6 |
| Resorcinol bis(diphenyl phosphate) (RDP) | | | | | | |
| 100% RDP | 1 | 1 | 1 | 3 | 3 | 3 |
| Blend of 75% RDP, 25% DEGDB (by wt) | 1 | 2 | 2 | 4 | 4 | 5 |
| Blend of 50% RDP, 50% DEGDB (by wt) | 1 | 2 | 5 | 6 | 6 | 6 |

TABLE 1-continued

Solubilities of Plasticizers

| | TEMPERATURE (° C.) | | | | | |
|---|---|---|---|---|---|---|
| | 23 | 75 | 100 | 140 | 150 | 160 |
| Blend of 25% RDP, 75% DEGDB (by wt) | 1 | 3 | 3 | 6 | 6 | 6 |
| Tri-butoxyethyl phosphate | 1 | 2 | 3 | 4 | 4 | 4 |
| Tributyl phosphate | 2 | 3 | 3 | 3 | 3 | 3 |
| Tricresyl phosphate | 1 | 3 | 3 | 4 | 6 | 6 |
| Triphenyl phosphate | 0 | 4 | 4 | 6 | 6 | 6 |
| Phthalic Acid Derivatives | | | | | | |
| Butyl benzyl phthalate | 2 | 3 | 3 | 6 | 6 | 6 |
| Texanol benzyl phthalate | 2 | 2 | 2 | 2 | 2 | 4 |
| Butyl octyl phthalate | 1 | 1 | 2 | 2 | 3 | 3 |
| Dicapryl phthalate | 1 | 1 | 1 | 1 | 2 | 2 |
| Dicyclohexyl phthalate | 0 | 1 | 2 | 2 | 4 | 5 |
| Di-(2-ethylhexyl) phthalate | 1 | 1 | 1 | 2 | 3 | 3 |
| Diethyl phthalate | 4 | 4 | 4 | 6 | 6 | 6 |
| Dihexyl phthalate | 1 | 2 | 3 | 3 | 3 | 3 |
| Diisobutyl phthalate | 1 | 3 | 3 | 3 | 3 | 5 |
| Diisodecyl phthalate | 1 | 1 | 1 | 1 | 2 | 2 |
| Diisoheptyl phthalate | 1 | 1 | 2 | 3 | 3 | 3 |
| Diisononyl phthalate | 1 | 1 | 1 | 1 | 2 | 3 |
| Diisooctyl phthalate | 1 | 1 | 2 | 2 | 3 | 3 |
| Dimethyl phthalate | 1 | 5 | 6 | 6 | 6 | 6 |
| Ditridecyl phthalate | 1 | 1 | 1 | 1 | 2 | 3 |
| Diundecyl phthalate | 1 | 1 | 1 | 2 | 2 | 2 |
| Ricinoleic Acid Derivatives | | | | | | |
| Butyl ricinoleate | 1 | 1 | 2 | 3 | 3 | 3 |
| Glycerol tri(acetyl) ricinlloeate | 1 | 1 | 1 | 2 | 1 | 1 |
| Methyl acetyl ricinlloeate | 1 | 1 | 2 | 3 | 3 | 3 |
| Methyl ricinlloeate | 1 | 2 | 3 | 3 | 3 | 4 |
| n-Butyl acetyl ricinlloeate | 1 | 1 | 1 | 2 | 3 | 3 |
| Propylene glycol ricinlloeate | 1 | 1 | 3 | 3 | 4 | 4 |
| Sebacic Acid Derivatives | | | | | | |
| Dibutyl sebacate | 1 | 2 | 3 | 3 | 3 | 3 |
| Di-(2-ethylhexyl) sebacate | 1 | 1 | 1 | 2 | 2 | 3 |
| Dimethyl sebacate | 0 | 4 | 4 | 6 | 6 | 6 |
| Stearic Acid Derivatives | | | | | | |
| Ethylene glycol monostearate | 0 | 1 | 2 | 3 | 3 | 3 |
| Glycerol monostearate | 0 | 0 | 1 | 2 | 2 | 2 |
| Isopropyl isostearate | 3 | 3 | 3 | 6 | 6 | 6 |
| Methyl stearate | 0 | 1 | 2 | 2 | 2 | 3 |
| n-Butyl stearate | 1 | 1 | 2 | 3 | 3 | 3 |
| Propylene glycol monostearate | 0 | 1 | 1 | 2 | 2 | 3 |
| Succinic Acid Derivatives | | | | | | |
| Diethyl succinate | 3 | 3 | 4 | 5 | 6 | 6 |
| Sulfonic Acid Derivatives | | | | | | |
| N-Ethyl o,p-toluenesulfonamide | 2 | 5 | 6 | 6 | 6 | 6 |
| o,p-toluenesulfonamide | 0 | 0 | 0 | 6 | 6 | 6 |

Key:
0 = Plasticizer is a solid at this temperature
1 = Plasticizer is liquid, yet nothing happening to the film
2 = film has begun to haze
3 = film has swollen
4 = film has begun to change as disintegrating off and/or liquid becoming hazy
5 = no longer a film, liquid is hazy
6 = liquid is clear A similar test to that above is described in *The Technology of Plasticizers*, by J. Kern Sears and Joseph R. Darby, published by Society of Plastic Engineers/Wiley and Sons, New York, 1982, pp 136-137. In this test, a grain of the polymer is placed in a drop of plasticizer on a heated microscope stage. If the polymer disappears, then it is solubilized. The plasticizers that are most effective at solubilizing the polyester of the instant invention have a solubility of greater than 4 according to Table 1 and can also be classified according to their solubility parameter. The solubility parameter, or square root of the cohesive energy density, of a plasticizer can be calculated by the method described by Coleman et al., *Polymer* 31, 1187 (1990). The most preferred plasticizers will have a solubility parameter (δ) in the range of about 9.5 to about 13.0 $cal^{0.5}$ $cm^{-1.5}$. It is generally understood that the solubility parameter of the plasticizer should be within 1.5 units of the solubility parameter of polyester. The data of Table 2 shows that plasticizers with a solubility parameter within this range solubilize the polyester while those plasticizers with a solubility parameter outside of this range are less effective.

TABLE 2

| Plasticizer | $\delta$ (cal$^{0.5}$ cm$^{-1.5}$) | Solubility @ 160° C. from Table 1 |
|---|---|---|
| Glycerol diacetate monolaurate | 8.1 | 4 |
| Texanol diisobutyrate | 8.4 | 4 |
| Di-2-ethylhexyladipate | 8.5 | 2 |
| Trioctyltrimellitate | 8.8 | 1 |
| Di-2-ethylhexylphthalate | 8.9 | 2 |
| Texanol benzyl phthalate | 9.5 | 4 |
| Neopentyl glycol dibenzoate | 9.8 | 6 |
| Dipropylene glycol dibenzoate | 10.0 | 6 |
| Butyl benzyl phthalate | 10.1 | 6 |
| Propylene glycol dibenzoate | 10.3 | 6 |
| Diethylene glycol dibenzoate | 10.3 | 6 |
| Glycerol tribenzoate | 10.6 | 6 |

In general, higher molecular weight plasticizers are preferred to prevent smoking and loss of plasticizer during the calendering process. The preferred range of plasticizer content will depend on the properties of the base polyester and the plasticizer. In particular, as the Tg of the polyester as predicted by the well-known Fox equation (T. G. Fox, Bull. Am. Phys. Soc., 1, 123 (1956)) decreases, the amount of plasticizer needed to obtain a polyester composition that may be calendered satisfactorily also decreases. Typically, the plasticizer comprises from about 5 to about 50 weight percent (wt %) of the polyester composition based on the total weight of the polyester composition. Other examples of plasticizer levels are about 10 to about 40 wt %, about 15 to about 40 wt %, and about 15 to about 30 wt % of the polyester composition.

Examples of plasticizers which may be used according to the invention are esters comprising: (i) acid residues comprising one or more residues of: phthalic acid, adipic acid, trimellitic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms. Further, non-limiting examples of alcohol residues of the plasticizer include methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol. The plasticizer also may comprise one or more benzoates, phthalates, phosphates, or isophthalates. In another example, the plasticizer comprises diethylene glycol dibenzoate, abbreviated herein as "DEGDB".

The polyester composition also may comprise a phosphorus-containing flame retardant, although the presence of a flame retardant is not critical to the invention. The phosphorus-containing flame retardant should be miscible with the polyester or the plasticized polyester. The term "miscible", as used herein," is understood to mean that the flame retardant and the plasticized polyester will mix together to form a stable mixture which will not separate into multiple phases under processing conditions or conditions of use. Thus, the term "miscible" is intended include both "soluble" mixtures, in which flame retardant and plasticized polyester form a true solution, and "compatible" mixtures, meaning that the mixture of flame retardant and plasticized polyester do not necessarily form a true solution but only a stable blend. Preferably, the phosphorus-containing compound is a non-halogenated, organic compound such as, for example, a phosphorus acid ester containing organic substituents. The flame retardant may comprise a wide range of phosphorus compounds well-known in the art such as, for example, phosphines, phosphites, phosphinites, phosphonites, phosphinates, phosphonates, phosphine oxides, and phosphates. Examples of phosphorus-containing flame retardants include tributyl phosphate, triethyl phosphate, tri-butoxyethyl phosphate, t-Butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine.

The term "phosphorus acid" as used in describing the phosphorus-containing flame retardants of the invention include the mineral acids such as phosphoric acid, acids having direct carbon-to-phosphorus bonds such as the phosphonic and phosphinic acids, and partially esterified phosphorus acids which contain at least one remaining unesterified acid group such as the first and second degree esters of phosphoric acid and the like. Typical phosphorus acids that can be employed in the present invention include, but are not limited to: dibenzyl phosphoric acid, dibutyl phosphoric acid, di(2-ethylhexyl)phosphoric acid, diphenyl phosphoric acid, methyl phenyl phosphoric acid, phenyl benzyl phosphoric acid, hexylphosphonic acid, phenylphosphonic acid tolylphosphonic acid, benzylphosphonic acid, 2-phenylethylphosphonic acid, methylhexylphosphinic acid, diphenylphosphinic acid, phenylnaphthylphosphinic acid, dibenzylphosphinic acid, methylphenylphosphinic acid, phenylphosphonous acid, tolylphosphonous acid, benzylphosphonous acid, butyl phosphoric acid, 2-ethyl hexyl phosphoric acid, phenyl phosphoric acid, cresyl phosphoric acid, benzyl phosphoric acid, phenyl phosphorous acid, cresyl phosphorous acid, benzyl phosphorous acid, diphenyl phosphorous acid, phenyl benzyl phosphorous acid, dibenzyl phosphorous acid, methyl phenyl phosphorous acid, phenyl phenylphosphonic acid, tolyl methylphosphonic acid, ethyl benzylphosphonic acid, methyl ethylphosphonous acid, methyl phenylphosphonous acid, and phenyl phenylphosphonous acid. The flame retardant typically comprises one or more mono-esters, diesters, or triesters of phosphoric acid. In another example, the flame retardant comprises resorcinol bis(diphenyl phosphate), abbreviated herein as "RDP".

The flame retardant may be added to the polyester composition at a concentration of about 5 wt % to about 40 wt % based on the total weight of the polyester composition. Other examples of the flame retardant levels are about 7 wt % to about 35 wt %, about 10 wt % to about 30 wt %, and about 10 wt % to about 25 wt %. The flame retardant polyester compositions of the present invention typically give a V2 or greater rating in a UL94 burn test. In addition, our flame retardant polyester compositions typically give a burn rate of 0 in the Federal Motor Vehicle Safety Standard 302 (typically referred to as FMVSS 302).

The phosphorus-containing flame retardant may also function as a plasticizer for the polyester. In this embodiment, the flame retardant may be substituted for a portion or all of the plasticizer component of the polyester composition, depending on the flame retardant's effectiveness as a plasticizer. Typically, when a plasticizing flame retardant is used, the amount of flame retardant need to achieve the desired burn rate or flame resistance of the calendered film or sheet is determined first, then the amount of plasticizer needed to produce the desired Tg of the film or sheet is adjusted.

Oxidative stabilizers also may be used with polyesters of the present invention to prevent oxidative degradation during processing of the molten or semi-molten material on the rolls. Such stabilizers include esters such as distearyl thiodipropionate or dilauryl thiodipropionate; phenolic stabilizers such as IRGANOX® 1010 available from Ciba-Geigy AG, ETHANOX® 330 available from Ethyl Corporation, and butylated hydroxytoluene; and phosphorus containing stabilizers such as IRGAFOS® available from Ciba-Geigy AG and WESTON® stabilizers available from GE Specialty Chemicals. These stabilizers may be used alone or in combinations.

It is also possible to use agents such as sulfoisophthalic acid to increase the melt strength of the polyester to a desirable level. In addition, the polyester compositions may contain dyes, pigments, fillers, matting agents, antiblocking agents, antistatic agents, blowing agents, chopped fibers, glass, impact modifiers, carbon black, talc, $TiO_2$ and the like as desired. Colorants, sometimes referred to as toners, may be added to impart a desired neutral hue and/or brightness to the polyester and the calendered product.

The various components of the polyester compositions such as, for example, the flame retardant, release additive, plasticizer, and toners, may be blended in batch, semicontinuous, or continuous processes. Small scale batches may be readily prepared in any high-intensity mixing devices well-known to those skilled in the art, such as Banbury mixers, prior calendering. The components also may be blended in solution in an appropriate solvent. The melt blending method includes blending the polyester, plasticizer, flame retardant, additive, and any additional non-polymerized components at a temperature sufficient to melt the polyester. The blend may be cooled and pelletized for further use or the melt blend can be calendered directly from this molten blend into film or sheet. The term "melt" as used herein includes, but is not limited to, merely softening the polyester. For melt mixing methods generally known in the polymer art, see "Mixing and Compounding of Polymers" (I. Manas-Zloczower & Z. Tadmor editors, Carl Hanser Verlag Publisher, 1994, New York, N.Y.). When colored sheet or film is desired, pigments or colorants may be included in the polyester mixture during the reaction of the diol and the dicarboxylic acid or they may be melt blended with the preformed polyester. A preferred method of including colorants is to use a colorant having thermally stable organic colored compounds having reactive groups such that the colorant is copolymerized and incorporated into the polyester to improve its hue. For example, colorants such as dyes possessing reactive hydroxyl and/or carboxyl groups, including, but not limited to, blue and red substituted anthraquinones, may be copolymerized into the polymer chain. When dyes are employed as colorants, they may be added to the polyester reaction process after an ester interchange or direct esterification reaction.

Our invention also includes a process for film or sheet, comprising calendering a polyester composition comprising:
(a) a polyester having a crystallization half time from a molten state of at least 30 minutes and an inherent viscosity of about 0.55 to about 0.75 dL/g in which the polyester is a random copolymer comprising
  (i) diacid residues comprising at least 80 mole percent, based on the total moles of diacid residues, of one or more residues of: terephthalic acid, naphthalenedicarboxylic acid, 1,4-cyclohexanedicarboxylic acid, or isophthalic acid;
  (ii) diol residues comprising about 10 to about 100 mole percent, based on the total moles or diol residues, of the residues of 1,4-cyclohexanedimethanol and 0 to about 90 mole percent of the residues of one or more diols selected from ethylene glycol, 1,2-propanediol, 1,3-propanediol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol; and
  (iii) branching monomer residues comprising about 0.05 to about 1 weight percent (wt %), based on the total weight of the polyester, of one or more residues of monomers having 3 or more carboxyl substituents, hydroxyl substituents, or a combination thereof; and
(b) an additive effective to prevent sticking of the polyester to calendering rolls. Any of the various isomers of naphthalenedicarboxylic acid or mixtures of isomers may be used, but the 1,4-, 1,5-, 2,6-, and 2,7-isomers are preferred. Also, 1,4-cyclohexanedicarboxylic acid may be present at the pure cis or trans isomer or as a mixture of cis and trans isomers. Additional examples of diols, modifying diacids, branching monomers, plasticizers, and flame retardants have been described hereinabove for the other embodiments of polyester compositions of the present invention. Other examples of I.V. values which may be exhibited by the polyester are about 0.55 to about 0.70 dL/g, about 0.55 to about 0.65 dL/g, and about 0.60 to about 0.65 dL/g.

The diol residues may comprise about 10 to about 100 mole percent of the residues of 1,4-cyclohexanedimethanol and 0 to about 90 mole % of the residues of ethylene glycol. In another example, the diol residues may comprise about 20 to about 80 mole percent of the residues of 1,4-cyclohexanedimethanol and about 20 to about 80 mole percent of the residues of ethylene glycol. In yet another example, the diol residues may comprise about 20 to about 65 mole percent of the residues of 1,4-cyclohexanedimethanol and the diacid residues about 95 to about 100 mole percent of the residues of terephthalic acid. In addition, the polyester also may further comprise from 0 to about 20 mole percent of the residues of one or more modifying diacids containing about 4 to about 40 carbon atoms as described previously for the polyester compositions of the present invention. Preferably, the modifying dicarboxylic acids include, but are not limited to, one or more of succinic acid, glutaric acid, adipic acid, suberic acid, sebacic acid, azelaic acid, dimer acid, or sulfoisophthalic acid. The polyester preferably includes the residues of a branching monomer comprising about 0.1 to about 0.7 weight percent of one or more residues of: trimellitic anhydride, pyromellitic dianhydride, glycerol, sorbitol, 1,2,6-hexanetriol, pentaerythritol, trimethylolethane, or trimesic acid.

Preferred additives comprise about 0.1 wt % to about 10 wt %, based on the total weight of the polyester composition, of one or more fatty acid amides, metal salts of organic acids, fatty acids, fatty acid esters, hydrocarbon waxes, phosphoric acid esters, chemically modified polyolefin waxes, glycerin esters, talc, or acrylic copolymers. Additional examples of additives to prevent sticking of the polyester to the calender rolls include one or more of: erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, or glycerol distearate.

As described hereinabove, the polyester composition may also comprise plasticizers and flame retardants as desired and appropriate for the intended application of the film. The preferred plasticizers are soluble in the polyester as indicated by dissolving a 5-mil (0.127 mm) thick film of the polyester to produce a clear solution at a temperature of 160° C. or less. In another embodiment, the preferred plasticizers are soluble in the polyester as indicated by dissolving a 5-mil (0.127 mm) thick film of the polyester to produce a clear solution at a temperature of 150° C. or less. The more preferred plasticizer comprises one or more aromatic rings and, more preferably, comprises one or more benzoates, phthalates, phosphates, or isophthalates, such as listed, for example, in Table 1. Examples of plasticizers include, but are not limited to, neopentyl glycol dibenzoate, diethylene glycol dibenzoate, butyl benzyl phthalate; and texanol benzyl phthalate. Typically, the plasticizer comprises from about 5 to about 50 weight percent (wt %) of the polyester composition based on the total weight of the polyester composition. Other examples of plasticizer levels are about 10 to about 40 wt %, about 15 to about 40 wt %, and about 15 to about 30 wt % of the polyester composition. The most preferred plasticizer is diethylene glycol dibenzoate.

A flame retardant may be added to the polyester composition at a concentration of about 5 wt % to about 40 wt % based on the total weight of the polyester composition. Other examples of flame retardant levels are about 7 wt % to about 35 wt %, about 10 wt % to about 30 wt %, and about 10 wt % to about 25 wt %. Preferably, the flame retardant comprises one or more monoesters, diesters, or triesters of phosphoric acid. The phosphorus-containing flame retardant may also function as a plasticizer for the polyester. In another example, the plasticizer comprises diethylene glycol dibenzoate and the flame retardant comprises resorcinol bis(diphenyl phosphate). The flame retardant film or sheet will typically give a V2 or greater rating in a UL94 burn test. In addition, our flame retardant film or sheet typically gives a burn rate of 0 in the Federal Motor Vehicle Safety Standard 302 (typically referred to as FMVSS 302).

Conventional calendering processes and equipment may be used to calender the polyester composition. In the process of the invention, polyester composition may comprise a molten, pellet, or powder form and is passed through a compressive nip between at least two calendering rolls at temperatures of about 100° C. to about 200° C. Typically, the polyester is blended with the plasticizer, flame retardants, additive, and other components. The mixed ingredients are plasticized in a kneader or extruder. Through heat, shearing, and pressure, the dry powders are fused to form a homogeneous, molten material. The extruder feeds the molten material in a continuous process to the top of the calendering section of the calendering line in between first and second heated calender rolls. Typically, four rolls are used to form three nips or gaps. For example, the rolls may be configured in an "L" shape, an inverted "L" shape", or a "Z" configuration. The rolls vary in size to accommodate different film widths. The rolls have separate temperature and speed controls. The material proceeds through the nip between the first two rolls, referred to as the feed nip. The rolls rotate in opposite directions to help spread the material across the width of the rolls. The material winds between the first and second, second and third, third and fourth rolls, etc. The gap between rolls decreases in thickness between each of the rolls such that the material is thinned between the sets of rolls as it proceeds. The resulting film or sheet, therefore, has a uniform thickness that is produced by passing the polyester composition through the compressive nips between the heated rolls. In effect, the polyester composition is squeezed between the nips which separate the rolls. Each successive nip between the calendering rolls reduces the film thickness until the final film or sheet gauge is obtained.

Typical processing temperatures for the rolls will generally range from about 80° C. to about 220° C., preferably about 100° C. to about 200° C., and more preferably about 130° C. to about 180° C. For some hydrolytically unstable polyesters, predrying the polyester resin composition or venting excess moisture during processing is desirable to prevent polymer degradation by hydrolysis. After passing through the calender section, the material moves through another series of rolls where it is stretched and gradually cooled forming a film or sheet. The material also may be embossed or annealed before cooling. The cooled material is then wound onto master rolls. General descriptions of calendering processes are disclosed in Jim Butschli, *Packaging World*, p. 26-28, June 1997 and W. V. Titow, *PVC Technology*, 4$^{th}$ Edition, pp 803-848 (1984), Elsevier Publishing Co.

Our invention thus further provides a film or sheet, prepared by a calendering process, comprising:
(a) a polyester having a crystallization half time from a molten state of at least 30 minutes and an inherent viscosity of about 0.55 to about 0.70 dL/g. wherein the polyester is a random copolymer comprising
  (i) diacid residues comprising at least 90 mole percent, based on the total moles of diacid residues, of one or more residues of: terephthalic acid, naphthalenedicarboxylic acid, 1,4-cyclohexanedicarboxylic acid, or isophthalic acid;
  (ii) diol residues comprising about 10 to about 100 mole percent, based on the total moles of diol residues, of one or more residues of: 1,4-cyclohexanedimethanol, neopentyl glycol, or diethylene glycol, and about 0 to about 90 mole percent of one or more residues of diols selected from ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol; and
  (iii) branching monomer residues comprising about 0.05 to about 0.7 wt %, based on the total weight of the polyester, of one or more residues of: trimellitic anhydride, pyromellitic dianhydride, glycerol, sorbitol, 1,2,6-hexanetriol, pentaerythritol, trimethylolethane, or trimesic acid; and
(b) about 0.1 wt % to about 10 wt %, based on the total weight of the polyester composition, of an additive effective to prevent sticking of the polyester to calendering rolls, wherein said additive comprises one or more fatty acid amides, metal salts of organic acids, fatty acids, fatty acid salts, fatty acid esters, hydrocarbon waxes, ester waxes, phosphoric acid esters, chemically modified polyolefin waxes; glycerin esters, talc, or acrylic copolymers.

The film or sheet may further encompass the various embodiments, concentration ranges, and combinations of diols, modifying diacids, branching monomers, plasticizers, and flame retardants described hereinabove for the polyester compositions and calendering processes of the instant invention. The invention is further illustrated and described by the following examples.

EXAMPLES

Examples 1-5

Calendering of Non-Plasticized Polyester

Five samples of branched and unbranched pelletized PETG containing 31 mole percent 1,4-cyclohexanedimethanol were calendered on a Dr. Collin two roll mill that was instrumented to measure bearing pressure, bank temperature, rotational resistance. The I.V. and amount of branching monomer for each sample is given in Table 3. Trimellitic anhydride was used as the branching monomer. The pellets were coated with 0.75 wt % of a montan wax release additive, directly added to the heated rolls, and processed into a melt. The processing roll set point temperature was between 145 and 175° C. Each sample was calendered at roll speeds between 5 and 20 rpm to determine the effect of I.V. and branching monomer on calendering line speeds as indicated by bearing pressure (i.e., the pressure exerted by the melt to separate the rolls as it is impinged in the gap between the rolls), roll resistance (i.e., the torque required to turn the rolls), and bank temperature (a measure of the temperature of melt as it mixes before entering the gap). Results are given in Tables 4-7.

TABLE 3

Non-Plasticized Polyester Compositions Used in Calendering Experiments

| Example | I.V. (dL/g) | Release Additive (Wt %) | Branching Monomer (Wt %) |
| --- | --- | --- | --- |
| 1 | 0.76 | 0.75 | 0 |
| 2 | 0.76 | 0.75 | 0 |
| 3 | 0.76 | 0.75 | 0.18 |
| 4 | 0.65 | 0.75 | 0 |
| 5 | 0.65 | 0.75 | 0.20 |

TABLE 4

Effect of Roll Speed on Total Resistance to Roll at a Roll Gap of 0.2 mm Non-plasticized compositions

| | Example | | | | |
| --- | --- | --- | --- | --- | --- |
| | 1 | 2 | 3 | 4 | 5 |
| | | | Roll Temp. ° C. | | |
| Roll Speed | 170 | 170 | 175 | 160 | 170 |
| | Total Resistance to Roll (Newton meters) | | | | |
| 5 RPM | 337 | 331 | 440 | 265 | 252 |
| 10 RPM | 431 | 396 | 406 | 337 | 313 |

TABLE 4-continued

Effect of Roll Speed on Total Resistance to Roll at a Roll Gap of 0.2 mm Non-plasticized compositions

| | Example | | | | |
| --- | --- | --- | --- | --- | --- |
| | 1 | 2 | 3 | 4 | 5 |
| | | | Roll Temp. ° C. | | |
| Roll Speed | 170 | 170 | 175 | 160 | 170 |
| | Total Resistance to Roll (Newton meters) | | | | |
| 15 RPM | 471 | 454 | 425 | 369 | 359 |
| 20 RPM | 487 | 481 | 451 | 400 | 378 |

As indicated by the data of Table 4, the presence of branching monomer lowered the roll resistance at the higher calender roll speeds. Lower I.V. also reduced roll resistance. The combination of lowered I.V. and branching monomer, however, resulted in the lowest roll resistance (Example 5). Examples 3 and 4 were not calendered at the same temperature as the other samples. The melt viscosity of Example 3 was too high to be processed at 170° C. and thus required a higher temperature of 175° C. By contrast, the melt strength of Example 4 was insufficient at 170° C. and required processing at a lower temperature of 160° C.

The data of Table 5 below indicates that the combination of lower I.V. and branching monomer, as exhibited by Example 5, resulted in decreased bearing pressure between calender rolls at each roll speed.

TABLE 5

Effect of Roll Speed on Bearing Pressure at a Roll Gap of 0.2 mm Non-plasticized compositions

| | Example | | | | |
| --- | --- | --- | --- | --- | --- |
| | 1 | 2 | 3 | 4 | 5 |
| | | | Roll Temp. ° C. | | |
| Roll Speed | 170 | 170 | 175 | 160 | 170 |
| | Bearing Pressure (kiloNewtons) | | | | |
| 5 RPM | 32 | 31 | 41 | 27 | 24 |
| 10 RPM | 38 | 37 | 34 | 34 | 28 |
| 15 RPM | 41 | 44 | 36 | 35 | 32 |
| 20 RPM | 44 | 47 | 38 | 39 | 33 |

Polymer that is being worked on a calender mill will form a bank of material on top of the processing rolls. The temperature of this bank, therefore, is related to the shear heating and shear thinning of the polyester. At slower processing speeds of 5 rpm, the normal heat transfer processes from the hot metal rolls will heat the materials. As the roll speed is increased, the internal viscosity and shear thinning characteristics of the material strongly influences the bank temperature. The data of Table 6 was collected at roll temperatures of 170° C., except for Example 4 which was collected at 160° C. Example 5 (IV=0.65 with 0.20% branching) showed the lowest temperature increase as the roll speed was increased, and thus indicated this material had increased shear thinning. This increased shear thinning would permit the composition of Example 5 to be processed at a higher throughput rate and at a lower processing temperature. No data was collected for Example 3 at a 5 RPM roll speed because the polyester composition did not form a consistent melt.

TABLE 6

Effect of Roll Speed on Bank Temperature at a Roll Gap of 0.2 mm Non-plasticized compositions

|  | Example | | | | |
|---|---|---|---|---|---|
|  | 1 | 2 | 3 | 4 | 5 |
|  | Roll Temp. ° C. | | | | |
|  | 170 | 170 | 170 | 160 | 170 |
| Roll Speed | Bank Temperature ° C. | | | | |
| 5 RPM | 166 | 166 | NA | 159 | 168 |
| 10 RPM | 174 | 175 | 169 | 165 | 170 |
| 15 RPM | 176 | 183 | 174 | 168 | 175 |
| 20 RPM | 181 | 186 | 178 | 170 | 175 |

Table 7 shows the occurrence of melt fracture within the calendered films as a function of roll speed. Melt fracture was determined visually by a rough, hazy, or frosty appearance in the sheet. In Table 7, an "MF" indicates a distinct or severe melt fracture whereas "Slight" indicates some haze was observed. For those experiments labeled "clear", no melt fracture was observed. As can be seen from the data of Table 7, only the polyesters having a lower I.V. (Example 4) or a combination of lower I.V. and branching showed no melt fracture at the higher roll speeds.

TABLE 7

Effect of Roll Speed on Melt Fracture at a Roll Gap of 0.2 mm Non-plasticized compositions

|  | Example | | | | |
|---|---|---|---|---|---|
|  | 1 | 2 | 3 | 4 | 5 |
|  | Roll Temp. ° C. | | | | |
|  | 170 | 170 | 175 | 160 | 170 |
| Roll Speed | Occurrence of Melt Fracture | | | | |
| 5 RPM | Clear | Clear | Clear | Clear | Clear |
| 10 RPM | Slight | Slight | Clear | Clear | Clear |
| 15 RPM | MF | MF | MF | Clear | Clear |
| 20 RPM | MF | MF | MF | Clear | Clear |

Examples 6-9

Calendering of Plasticized Polyesters

The polyesters of examples 1 and 3-5 were plasticized to form a flexible polyester composition. The PETG samples were melt blended with a release additive concentrate (Tsunami® ADD2, available from Eastman Chemical Company) containing about 15 wt % of a mixture of montan waxes pre-compounded into Tsunami® Copolyester GS-2. The final composition contained 0.9 wt % release additive and 15 wt % diethyleneglycol dibenzoate (DEGDB) plasticizer, obtained from Velsicol Chemical Corporation). The composition of each sample prior to calendering is shown in Table 8. The I.V. data shown in Table 8 were measured on the PETG polyester before melt-blending of the additive and plasticizer. The polyesters were not dried prior to melt-blending and calendering. The polyester compositions were prepared on a Haake-Buchler Rheocord® System 40 using a bowl charge of 375 grams, a bowl temperature was of 130° C., and a blade speed of 100 rpm. For each sample, a LabView® computer system was used to record torque and temperature as a function of time. After the torque of the mixing bowl reached its peak value, mixing was allowed to continue until the melt temperature reached 150° C. before the batch was terminated and the contents of the mixing bowl removed.

TABLE 8

Plasticized Polyester Compositions Used in Calendering Experiments

| Example | I.V. (dL/g) (PETG polymer) | DEGDB (Wt %) | Release Additive (Wt %) | Branching Monomer (Wt %) |
|---|---|---|---|---|
| 6 | 0.76 | 15 | 0.9 | 0 |
| 7 | 0.76 | 15 | 0.9 | 0.18 |
| 8 | 0.65 | 15 | 0.9 | 0 |
| 9 | 0.65 | 15 | 0.9 | 0.20 |

The calendering results are shown in Tables 9-11. Many of the same trends observed for the non-plasticized samples also hold for plasticized materials. The differences in processing behaviors, however, were somewhat smaller because of the effect of the plasticizer on processing. The plasticized compositions could be calendered at lowered temperatures. Even at the lower processing temperatures, the branched composition having the lower I.V. (Example 9) showed a lower bearing pressure and lower rotational force in comparison to the higher I.V. and non-branched materials. Data on bank temperature for plasticized compositions is shown in Table 11; no significant differences in the bank temperatures were observed. The data for Example 9 in Tables 9 and 10 are somewhat erratic because of the low processing temperature which resulted in poor flow characteristics. The composition of Example 7 did not flow well until the rotational speed of the rollers was increased to 20 rpm. The lower I.V., branched material (Example 9) showed lower rotational resistance and bearing pressure at the same processing temperature. The lower rotational resistance and bearing pressure exhibited by Example 9 would be expected to allow this compositon to be calendered faster and/or at a lower temperature.

TABLE 9

Effect of Roll Speed on Total Rotational Resistance at a Roll Gap of 0.1 mm Plasticized compositions

|  | Example | | | |
|---|---|---|---|---|
|  | 6 | 7 | 8 | 9 |
|  | Roll Temp. ° C. | | | |
|  | 145 | 145 | 145 | 145 |
| Roll Speed | Rotational Resistance (Newton meters) | | | |
| 5 RPM | 239 | 284 | 168 | 146 |
| 10 RPM | 258 | 339 | 203 | 185 |
| 20 RPM | 290 | 262 | 219 | 194 |

TABLE 10

Effect of Roll Speed on Bearing Pressure at a
Roll Gap of 0.1 mm Plasticized compositions

| | Example | | | |
|---|---|---|---|---|
| | 6 | 7 | 8 | 9 |
| | | Roll Temp. ° C. | | |
| Roll Speed | 145 | 145 | 145 | 145 |
| | | Bearing Pressure (kiloNewtons) | | |
| 5 RPM | 23 | 26 | 18 | 17 |
| 10 RPM | 27 | 33 | 24 | 21 |
| 20 RPM | 31 | 28 | 25 | 24 |

TABLE 11

Effect of Roll Speed on Bank Temperature at a
Roll Gap of 0.2 mm Plasticized compositions

| | Example | | | |
|---|---|---|---|---|
| | 6 | 7 | 8 | 9 |
| | | Roll Temp. ° C. | | |
| Roll Speed | 145 | 145 | 145 | 145 |
| | | Bank Temperature ° C. | | |
| 5 RPM | 142 | 122 | 133 | 143 |
| 10 RPM | 147 | 136 | 144 | 151 |
| 20 RPM | 162 | 161 | 156 | 160 |

Examples 10-13

Four samples of branched PETG containing 50 mole percent 1,4-cyclohexanedimethanol, 0.2 wt % trimellitic anhydride, and having I.V. values ranging from 0.60 to 0.74 dL/g, were coated with 0.75% wt % of a montan wax release additive and calendered at a roll speed of 20 RPM using the procedures described in Examples 1-5. The calendering results are shown in Table 12. The best processing characteristics as indicated by roll resistance, bearing pressure, bank temperature were obtained from the composition having an I.V. of 0.65 dL/g (Example 12), although the composition of Example 11 gave satisfactory results under the conditions of the experiment. Example 13 could not be processed under the calendering conditions of the experiment.

TABLE 12

Effect of inherent viscosity on calendering (20 RPM roll speed)

| | Example | | | |
|---|---|---|---|---|
| | 10 | 11 | 12 | 13 |
| I.V. (dL/g) | 0.74 | 0.70 | 0.65 | 0.60 |
| Roll Temp. ° C. | 170 | 170 | 170 | 170 |
| Total Roll Resistance (Nm) | 490 | 422 | 381 | NA |
| Bearing Pressure (kN) | 43 | 34 | 31 | NA |
| Bank Temperature ° C. | 171 | 166 | 169 | NA |

We claim:

1. A polyester composition for calendering, comprising:
   (a) a polyester comprising diacid residues, diol residues, and about 0.1 to about 0.3 weight percent branching monomer residues, based on the total weight of said polyester, wherein said polyester is a random copolymer having a crystallization half time from a molten state of at least 5 minutes and an inherent viscosity of about 0.6 to about 0.7 deciliters/gram (dL/g); and
   (b) an additive effective to prevent sticking of said polyester to calendering rolls.

2. The polyester composition of claim 1 wherein (i) said diacid residues comprise at least 80 mole percent, based on the total moles of diacid residues, of one or more residues of: terephthalic acid, naphthalenedicarboxylic acid, 1,4-cyclohexanedicarboxylic acid, or isophthalic acid; and (ii) said diol residues comprise about 10 to about 100 mole percent, based on the total moles of diol residues, of the residues of 1,4-cyclohexanedimethanol and 0 to about 90 mole percent of one or more residues of: ethylene glycol, 1,2-propanediol, 1,3-propanediol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, or polyalkylene glycol.

3. The polyester composition of claim 2 wherein said diol residues comprise about 10 to about 100 mole percent of the residues of 1,4-cyclohexanedimethanol and 0 to about 90 mole percent of the residues of ethylene glycol.

4. The polyester composition of claim 3 wherein said diacid residues further comprise 0 to about 20 mole percent of one or more residues of modifying diacids containing about 4 to about 40 carbon atoms.

5. The polyester composition of claim 4 wherein said modifying diacid comprises one or more of: succinic acid, glutaric acid, adipic acid, suberic acid, sebacic acid, azelaic acid, dimer acid, or sulfoisophthalic acid.

6. The polyester composition of claim 5 wherein said branching monomer residues comprise one or more residues of monomers having 3 or more carboxyl substituents, hydroxyl substituents, or a combination thereof.

7. The polyester composition of claim 6 wherein said branching monomer residues comprise one or more residues of: trimellitic anhydride, pyromellitic dianhydride, glycerol, sorbitol, 1,2,6-hexanetriol, pentaerythritol, trimethylolethane, or trimesic acid.

8. The polyester composition of claim 7 wherein said additive comprises about 0.1 wt % to about 10 wt %, based on the total weight of said polyester composition, of one or more fatty acid amides, metal salts of organic acids, fatty acids, fatty acid salts, fatty acid esters, hydrocarbon waxes, ester waxes, phosphoric acid esters, chemically modified polyolefin waxes; glycerin esters, talc, or acrylic copolymers.

9. The polyester composition of claim 8 wherein said additive comprises one or more of: erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, or glycerol distearate.

10. The polyester composition of claim 9 wherein said crystallization half time of said polyester is at least 12 minutes.

11. The polyester composition of claim 10 wherein said crystallization half time is at least 30 minutes.

12. A polyester composition for calendering, comprising:
    (a) a polyester having a crystallization half time from a molten state of at least 30 minutes and an inherent viscosity of about 0.6 to about 0.70 dL/g, wherein said polyester is a random copolymer comprising
        (i) diacid residues comprising at least 90 mole percent, based on the total moles of diacid residues, of one or more residues of: terephthalic acid, naphthalenedicarboxylic acid, 1,4-cyclohexanedicarboxylic acid, or isophthalic acid;

(ii) diol residues comprising about 20 to about 70 mole percent, based on the total moles of diol residues, of one or more residues of: 1,4-cyclohexanedimethanol, neopentyl glycol, or diethylene glycol, and about 30 to about 80 mole percent of the residues of one or more diols selected from ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol; and (iii) branching monomer residues comprising about 0.1 to about 0.3 wt %, based on the total weight of said polyester, of one or more residues of: trimellitic anhydride, pyromellitic dianhydride, glycerol, sorbitol, 1,2,6-hexanetriol, pentaerythritol, trimethylolethane, or trimesic acid; and (b) about 0.1 wt % to about 10 wt %, based on the total weight of said polyester composition, of an additive effective to prevent sticking of said polyester to calendering rolls, wherein said additive comprises one or more fatty acid amides, metal salts of organic acids, fatty acids, fatty acid salts, fatty acid esters, hydrocarbon waxes, ester waxes, phosphoric acid esters, chemically modified polyolefin waxes; glycerin esters, talc, or acrylic copolymers.

13. The polyester composition of claim 12 wherein said additive comprises (i) a fatty acid or a salt of a fatty acid containing more than 18 carbon atoms and (ii) an ester wax comprising a fatty acid residue containing more than 18 carbon atoms with an alcohol residue containing from 2 to 28 carbon atoms, wherein the ratio of said fatty acid or said salt of a fatty acid to said ester wax is 1:1 or greater.

14. The polyester composition of claim 13 wherein said fatty acid comprises montanic acid; said salt of a fatty acid comprises one or more of: the sodium salt of montanic acid, the calcium salt of montanic acid, or the lithium salt of montanic acid; and said fatty acid residue of said ester wax comprises montanic acid.

15. The polyester composition of claim 12 further comprising a plasticizer comprising one or more aromatic rings wherein said plasticizer dissolves a 5-mil (0.127 mm) thick film of said polyester to produce a clear solution at a temperature of 160° C. or less.

16. The polyester composition of claim 15 wherein said plasticizer comprises diethylene glycol dibenzoate.

17. The polyester composition of claim 12 further comprising about 5 to about 40 wt %, based on the total weight of said polyester composition, of a flame retardant comprising one or more monoesters, diesters, or triesters of phosphoric acid wherein said flame retardant is miscible with said polyester.

18. The polyester composition of claim 17 wherein said flame retardant comprises resorcinol bis(diphenyl phosphate).

19. A process for film or sheet, comprising calendering a polyester composition at calendar roll temperature of about 160° C. to about 190° C. said polyester composition comprising:

(a) a polyester having a crystallization half time from a molten state of at least 30 minutes and an inherent viscosity of about 0.6 to about 0.7 dL/g, wherein said polyester is a random copolymer comprising (i) diacid residues comprising at least 80 mole percent, based on the total moles of diacid residues, of one or more residues of: terephthalic acid, naphthalenedicarboxylic acid, 1,4-cyclohexanedicarboxylic acid, or isophthalic acid;

(ii) diol residues comprising about 10 to about 100 mole percent, based on the total moles of diol residues, of the residues of 1,4-cyclohexanedimethanol and 0 to about 90 mole percent of the residues of one or more diols selected from ethylene glycol, 1,2-propanediol, 1,3-propanediol, 1,4-butanediol, 1,5-pentanediol, neopentyl glycol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol; and (iii) branching monomer residues comprising about 0.01 to about 0.3 weight percent (wt %), based on the total weight of said polyester, of the residues of one or more of monomers having 3 or more carboxyl substituents, hydroxyl substituents, or a combination thereof; and (b) an additive effective to prevent sticking of said polyester to calendering rolls.

20. The process of claim 19 wherein said branching monomer residues comprise one or more residues of: trimellitic anhydride, pyromellitic dianhydride, glycerol, sorbitol, 1,2,6-hexanetriol, pentaerythritol, trimethylolethane, or trimesic acid.

21. The process of claim 20 wherein said diol residues comprise about 10 to about 100 mole percent of the residues of 1,4-cyclohexanedimethanol and 0 to about 90 mole percent of the residues of ethylene glycol.

22. The polyester composition of claim 21 wherein said diol residues comprise about 20 to about 80 mole percent of the residues of 1,4-cyclohexanedimethanol and about 20 to about 80 mole percent of the residues of ethylene glycol.

23. The process of claim 22 wherein said diacid residues comprise about 95 to 100 mole percent of the residues of terephthalic acid and said diol residues comprise about 20 to 65 mole percent of the residues of 1,4-cyclohexanedimethanol.

24. The process of claim 20 wherein said diacid residues further comprise 0 to about 20 mole percent of one or more residues of modifying diacids containing about 4 to about 40 carbon atoms.

25. The process of claim 24 wherein said modifying diacids comprise one or more of: succinic acid, glutaric acid, adipic acid, suberic acid, sebacic acid, azelaic acid, dimer acid, or sulfoisophthalic acid.

26. The process of claim 20 wherein said additive comprises about 0.1 wt % to about 10 wt %, based on the total weight of said polyester composition, of one or more fatty acid amides, metal salts of organic acids, fatty acids, fatty acid salts, fatty acid esters, hydrocarbon waxes, ester waxes, phosphoric acid esters, chemically modified polyolefin waxes; glycerin esters, talc, or acrylic copolymers.

27. The process of claim 26 wherein said additive comprises one or more of: erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, or glycerol distearate.

28. The process of claim 27 further comprising a plasticizer comprising one or more aromatic rings wherein said plasticizer dissolves a 5-mil (0.127 mm) thick film of said polyester to produce a clear solution at a temperature of 160° C. or less.

29. The process of claim 28 wherein said plasticizer comprises diethylene glycol dibenzoate.

30. The process of claim 20 further comprising about 5 to about 40 wt %, based on the total weight of said polyester composition, of a flame retardant comprising one or more monoesters, diesters, or triesters of phosphoric acid.

31. The process of claim 30 wherein said flame retardant comprises resorcinol bis(diphenyl phosphate).

32. A film or sheet, comprising:
(a) a polyester having a crystallization half time from a molten state of at least 30 minutes and an inherent viscosity of about 0.6 to about 0.70 dL/g, wherein said polyester is a random copolymer comprising
 (i) diacid residues comprising at least 90 mole percent, based on the total moles of diacid residues, of one or more residues of: terephthalic acid, naphthalenedicarboxylic acid, 1,4-cyclohexanedicarboxylic acid, or isophthalic acid;
 (ii) diol residues comprising about 10 to about 100 mole percent, based on the total moles of diol residues, of one or more residues of: 1,4-cyclohexanedimethanol, neopentyl glycol, or diethylene glycol, and 0 to about 90 mole percent of one or more residues of diols selected from ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol; and
 (iii) branching monomer residues comprising about 0.1 to about 0.3 wt %, based on the total weight of said polyester, of one or more residues of: trimellitic anhydride, pyromellitic dianhydride, glycerol, sorbitol, 1,2,6-hexanetriol, pentaerythritol, trimethylolethane, or trimesic acid; and
(b) about 0.1 wt % to about 10 wt %, based on the total weight of said polyester composition, of an additive effective to prevent sticking of said polyester to calendering rolls, wherein said additive comprises one or more fatty acid amides, metal salts of organic acids, fatty acids, fatty acid salts, fatty acid esters, hydrocarbon waxes, ester waxes, phosphoric acid esters, chemically modified polyolefin waxes; glycerin esters, talc, or acrylic copolymers;

wherein said film or sheet is prepared by a calendering process.

33. The film or sheet prepared by the process of any one of claims 21, 22, or 25, 26, 27, 28, 29, 30, or 31.

* * * * *